(12) United States Patent
Zakowski et al.

(10) Patent No.: US 9,924,825 B2
(45) Date of Patent: Mar. 27, 2018

(54) COOKING APPLIANCE

(75) Inventors: Joseph W. Zakowski, New Canaan, CT (US); Barbara L. Schnabel, Chappaqua, NY (US); Maria Caruso, Stamford, CT (US)

(73) Assignee: CONAIR CORPORATION, Stamford, CT (US)

( * ) Notice: Subject to any disclaimer, the term of this patent is extended or adjusted under 35 U.S.C. 154(b) by 720 days.

(21) Appl. No.: 13/372,819

(22) Filed: Feb. 14, 2012

(65) Prior Publication Data

US 2012/0213900 A1   Aug. 23, 2012

Related U.S. Application Data

(60) Provisional application No. 61/443,965, filed on Feb. 17, 2011.

(51) Int. Cl.
*A21B 1/00* (2006.01)
*A47J 27/04* (2006.01)

(52) U.S. Cl.
CPC ..................... *A47J 27/04* (2013.01)

(58) Field of Classification Search
CPC ......... A47J 43/046; A47J 36/165; A47J 27/04
USPC ................. 99/353, 492, 348, 537, 337, 338, 99/326–333; 219/401, 720, 702, 432, 219/386, 433, 441; 241/282.2, 282.1, 241/35.7, 36, 92
See application file for complete search history.

(56) References Cited

U.S. PATENT DOCUMENTS

| | | | |
|---|---|---|---|
| 5,074,201 A * | 12/1991 | Takeyama et al. | 99/483 |
| 5,794,524 A | 8/1998 | Kemker et al. | |
| 6,076,452 A | 6/2000 | Dessuise | |
| 6,505,545 B2 | 1/2003 | Kennedy et al. | |
| 6,550,372 B1 * | 4/2003 | Sharples | 99/331 |
| 6,629,492 B1 * | 10/2003 | Li | 99/337 |
| 7,617,766 B2 | 11/2009 | Tracy et al. | |
| 7,878,701 B2 | 2/2011 | Stephens et al. | |
| 2004/0065211 A1 | 4/2004 | McNair | |
| 2006/0263501 A1 * | 11/2006 | Oghafua et al. | 426/523 |
| 2008/0135654 A1 * | 6/2008 | Pryor et al. | 241/37.5 |
| 2008/0257168 A1 * | 10/2008 | Wolfe | 99/348 |
| 2011/0014342 A1 | 1/2011 | Picozza et al. | |
| 2011/0056388 A1 | 3/2011 | Lin | |

* cited by examiner

*Primary Examiner* — Phuong Nguyen
(74) *Attorney, Agent, or Firm* — Grogan, Tuccillo & Vanderleeden, LLP

(57) ABSTRACT

A cooking appliance in accordance with the present invention includes a base, a container engageable with the base and configured to receive one or more food ingredients, a blade assembly rotatably mounted in the container and a lid engageable with said container. The lid includes a chamber configured to hold a volume of liquid and a heating element for heating the liquid within the chamber to produce steam.

12 Claims, 20 Drawing Sheets

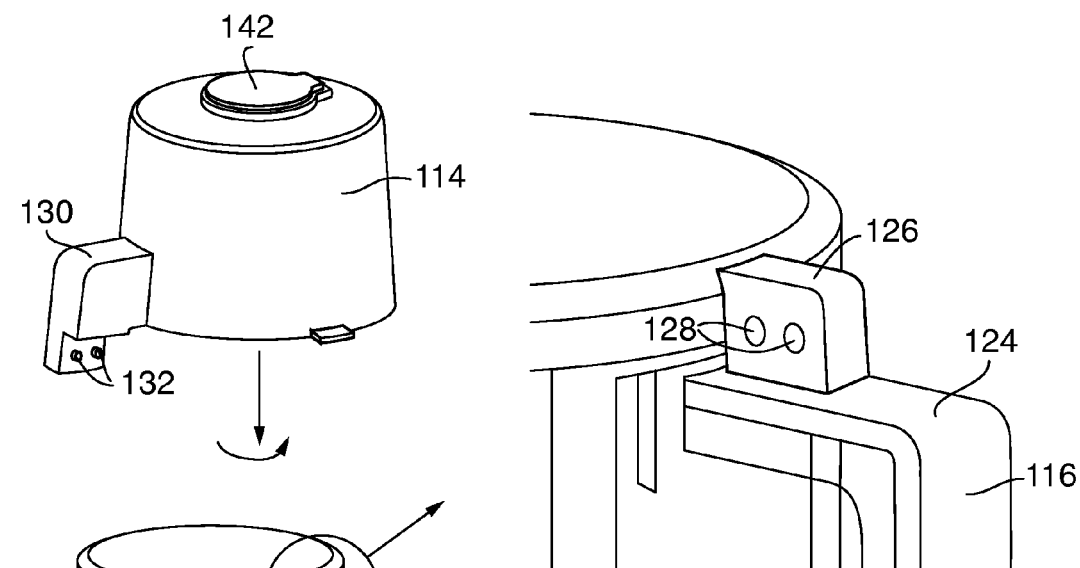
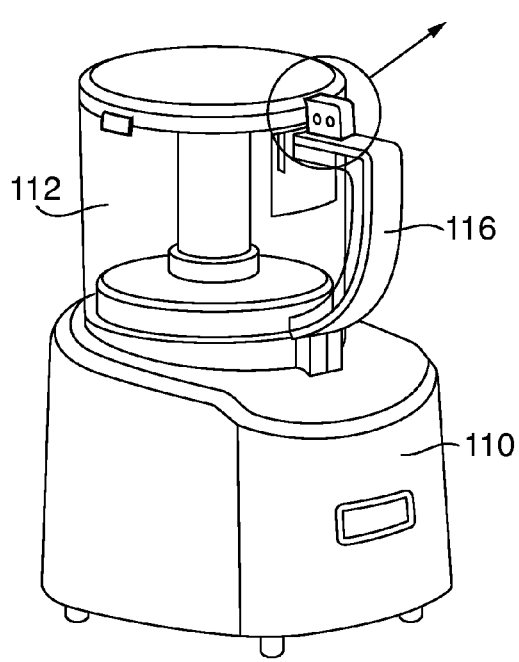
FIG. 16
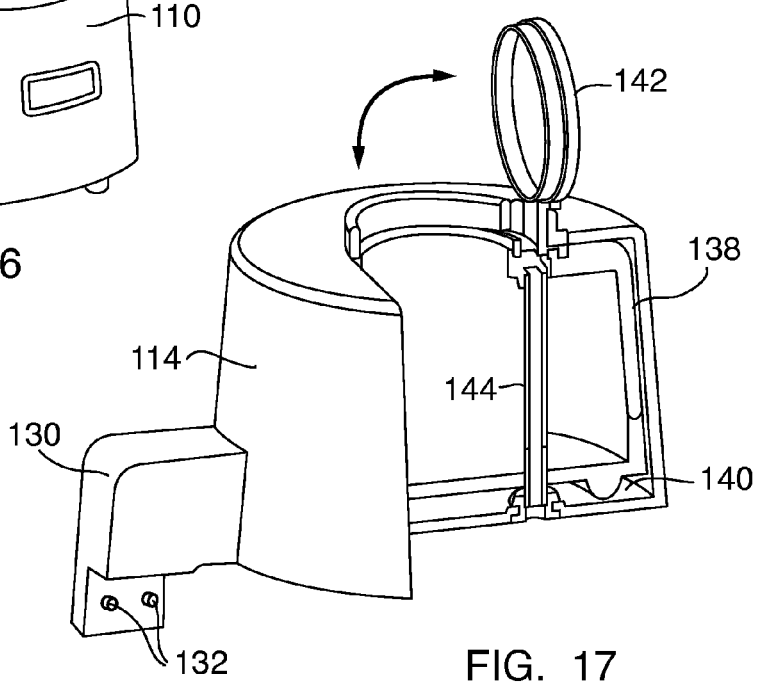
FIG. 17

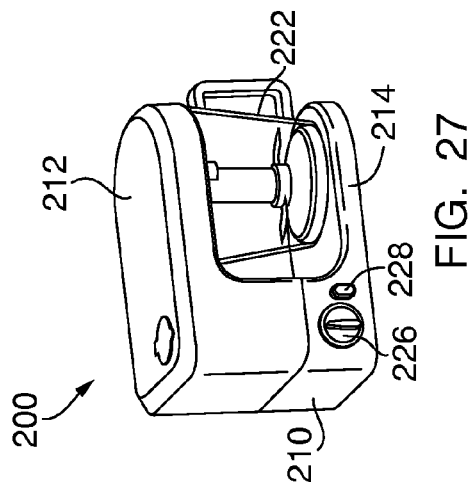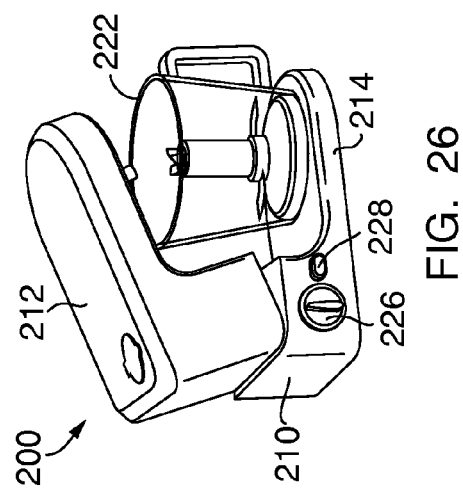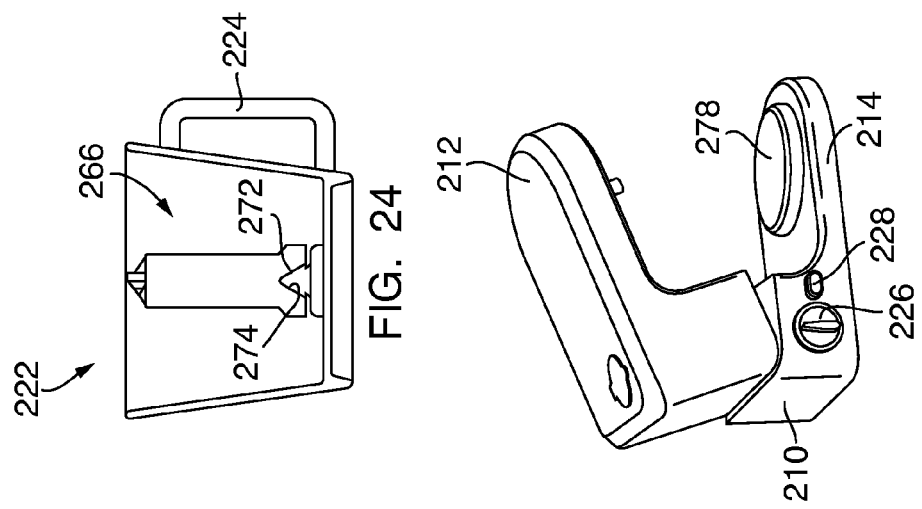

COOKING APPLIANCE

CROSS-REFERENCE TO RELATED APPLICATIONS

This application claims the benefit of U.S. Provisional Application Ser. No. 61/443,965, filed on Feb. 17, 2011, which is herein incorporated by reference in its entirety.

FIELD OF THE INVENTION

The present invention relates generally to cooking appliances and, more particularly, to counter-top cooking appliances for preparing food products by use of chopping, mixing, cutting and application of heat or steam.

BACKGROUND OF THE INVENTION

Various food appliances exist for processing (i.e., cutting, chopping, mixing) food ingredients and cooking them through the application of heat or steam. Certain known appliances that function in this manner and are adapted to fit on a countertop are used for preparation of baby food or infant food, but may also be used for preparing food products such as soups, dips, sauces and the like.

While existing food appliances are generally suitable for what is regarded as ordinary performance, there is room for improvement in terms of efficiency, convenience and effectiveness.

SUMMARY OF THE INVENTION

It is an object of the present invention to provide a cooking appliance that is adapted to efficiently, conveniently and effectively process and cook food ingredients.

These and other objects are achieved by the present invention.

BRIEF DESCRIPTION OF THE DRAWINGS

The present invention will be better understood from reading the following description of non-limiting embodiments, with reference to the attached drawings, wherein below:

FIG. 16 is an exploded, perspective view of the cooking appliance of FIG. 13, illustrating the connection between the lid and the bowl.

FIG. 17 is a perspective view of the lid of the cooking appliance of FIG. 13.

FIG. 24 is a side, elevational view of a bowl for use with the cooking appliance of FIG. 19.

FIG. 25 is a perspective view of the cooking appliance of FIG. 19, showing a loading position with the bowl removed.

FIG. 26 is a perspective view of the cooking appliance of FIG. 19, showing a loading position with the bowl attached.

FIG. 27 is another perspective view of the cooking appliance of FIG. 19, illustrating a ready position.

DETAILED DESCRIPTION OF THE PREFERRED EMBODIMENT

Cooking appliances in accordance with the preferred embodiments of the present invention are directed, generally, to an appliance having a work bowl in which a rotatable blade assembly is positioned and, subsequently, the bowl is loaded with food ingredients to be processed and cooked. A cover is positioned over the bowl and water is added to a steam-producing chamber that is in communication with the bowl. The steam-producing chamber is heated to cause the water to boil and generate steam/cooking vapor. The steam travels into the bowl and contacts the food ingredients in order to heat or cook them. A certain amount of condensation from the steam is collected in the bowl and is combined with the food ingredients to form a puree, semi-liquid, or liquid as desired, and depending upon the specific ingredients and amounts.

After steaming, the food ingredients may be processed by the rotatable blade assembly. Depending on the blade and the chosen speed and duration of rotation, the food ingredients may be chopped, mixed or pureed.

Appliances according to the present invention include a single bowl design in which steaming and processing are carried out without the need to transfer the food ingredients to additional containers to carry out separate steaming and processing functions.

Figure 1:
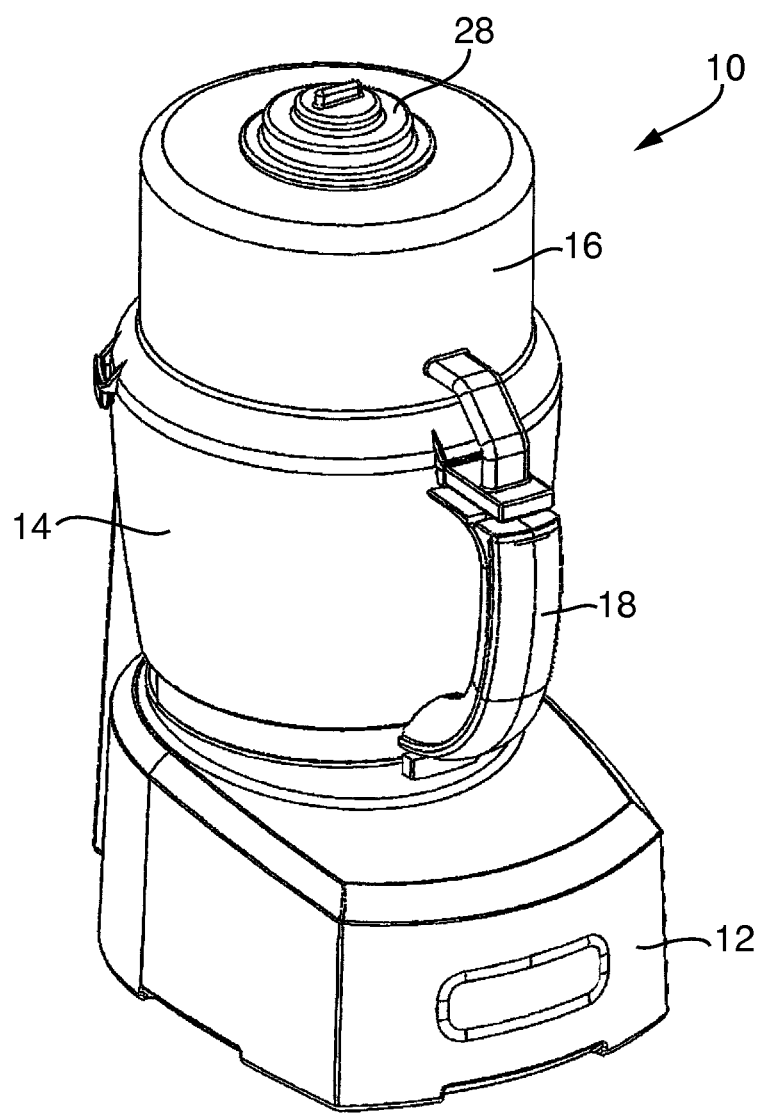
FIG. 1 is a perspective view of a cooking appliance according to a first embodiment of the present invention.

FIGS. 1-12 illustrate a first preferred embodiment of the present invention. are line drawings illustrating a first embodiment of the present invention. With reference to FIG. 1, a cooking appliance 10 includes a base 12, a bowl 14 releasably received on the base 12, and a lid 16 releasably attached to the bowl 12. The base 12 houses an electric motor (not shown) and associated electrical and mechanical components (not shown) associated with the motor, its drive output, the heat element, and controls, all of types generally known to those of ordinary skill in the art. An electrical cord (not shown) extends from the base 12 and plugs into and outlet of an external electrical power source. Control buttons or dials (not shown), of a type generally known to those of ordinary skill in the art, may be provided on the base 12 for enabling a user to control operation of the appliance 10 in the manner described herein. A handle 18 is provided on the outside of the bowl 12 to enable a user to remove or attach the bowl 14 to the base 12.

Figure 2:
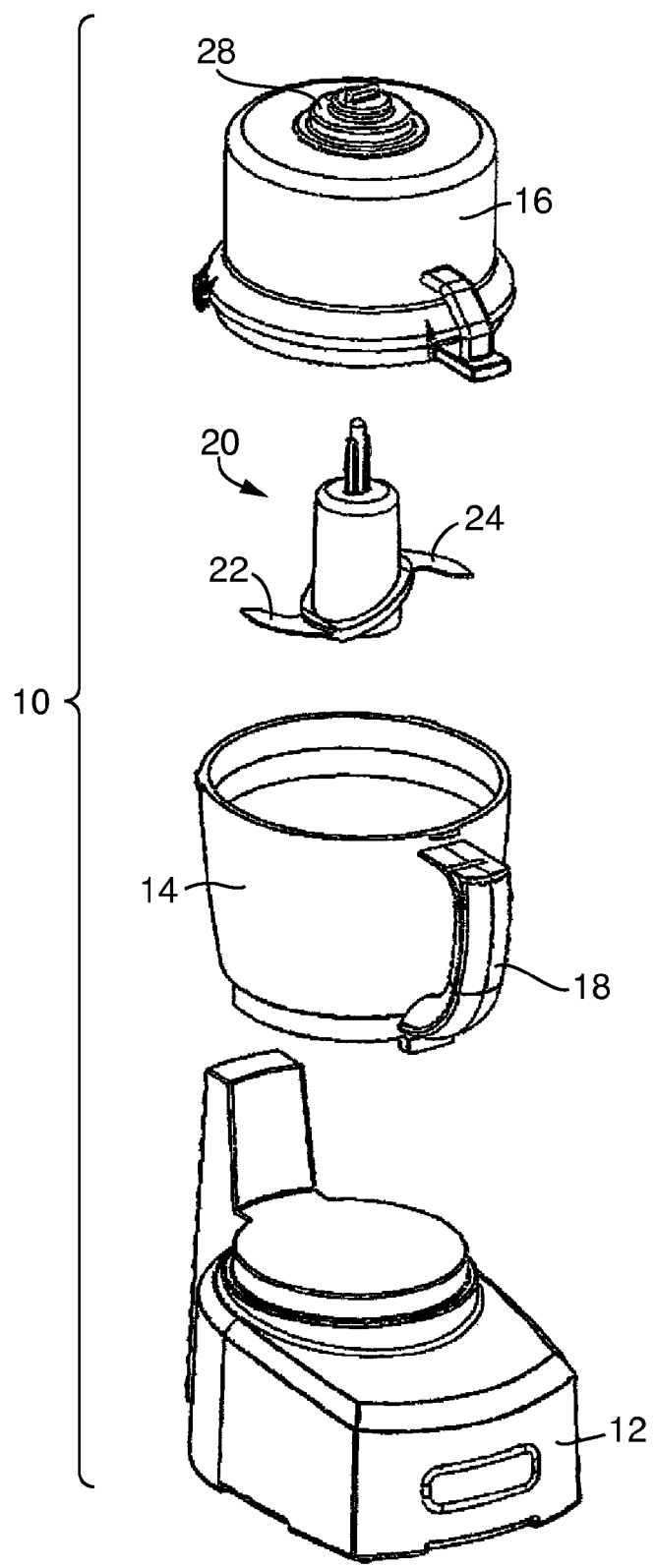
FIG. 2 is a partial exploded, perspective view of the cooking appliance of FIG. 1.

Referring now to FIG. 2, an exploded view of the appliance 10 is shown. As shown therein, a blade assembly 20 having a pair of blade edges 22, 24 is rotatably mounted within the bowl 14. In particular, the blade assembly 20 is received on a rotatably driven output shaft (not shown) extending upwards from the base 12 through an opening (not shown) in the floor of the bowl 14, as is known in the art.

Figure 3:
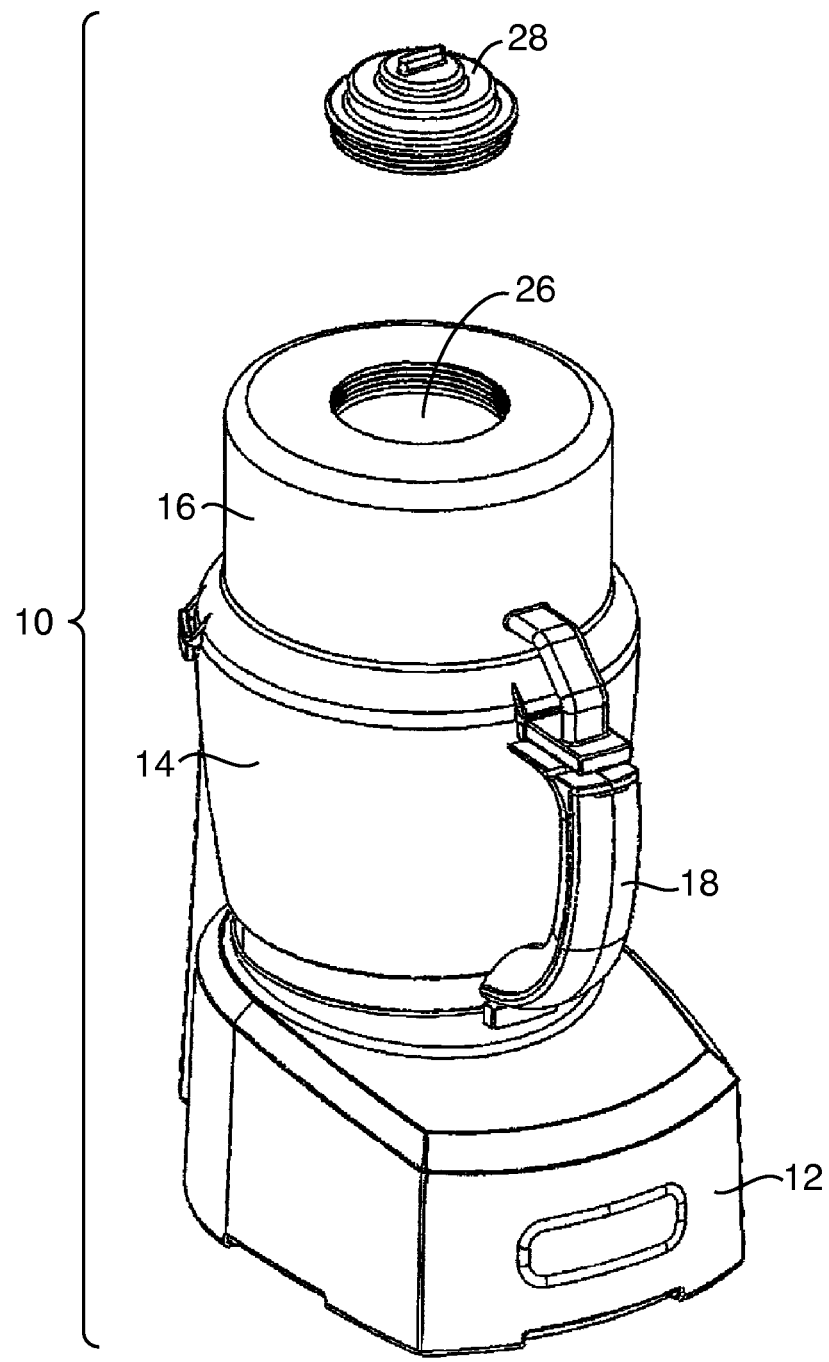
FIG. 3 is perspective view of the cooking appliance of FIG. 1, illustrating the cap removed from the lid.
Figure 4:
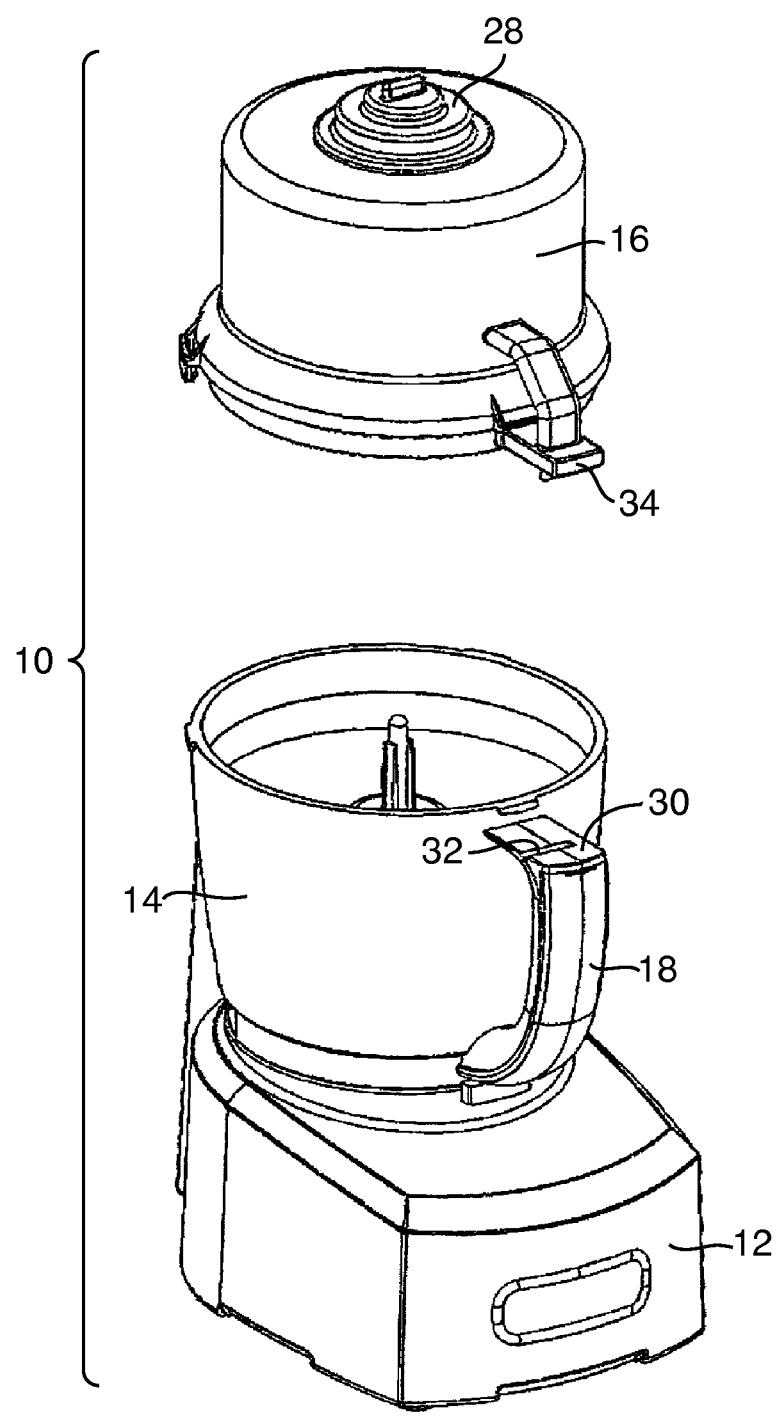
FIG. 4 is a perspective view of the cooking appliance of FIG. 1, illustrating the lid removed from the base.

With reference to FIG. 3, the lid 16 of the cooking appliance 10 includes a boiler and boiler chamber 26, as will be illustrated in more detail in FIGS. 6, 9, 10 and 11. The lid 16 has a removable cap 28 that provides access to the interior boiler chamber 26 of the lid so that a user can add water to the boiler chamber 26. As shown in FIG. 4, the lid 16, itself, is removable from the bowl 14 to allow a user to place one or more food ingredients within the bowl 14.

Figure 5:
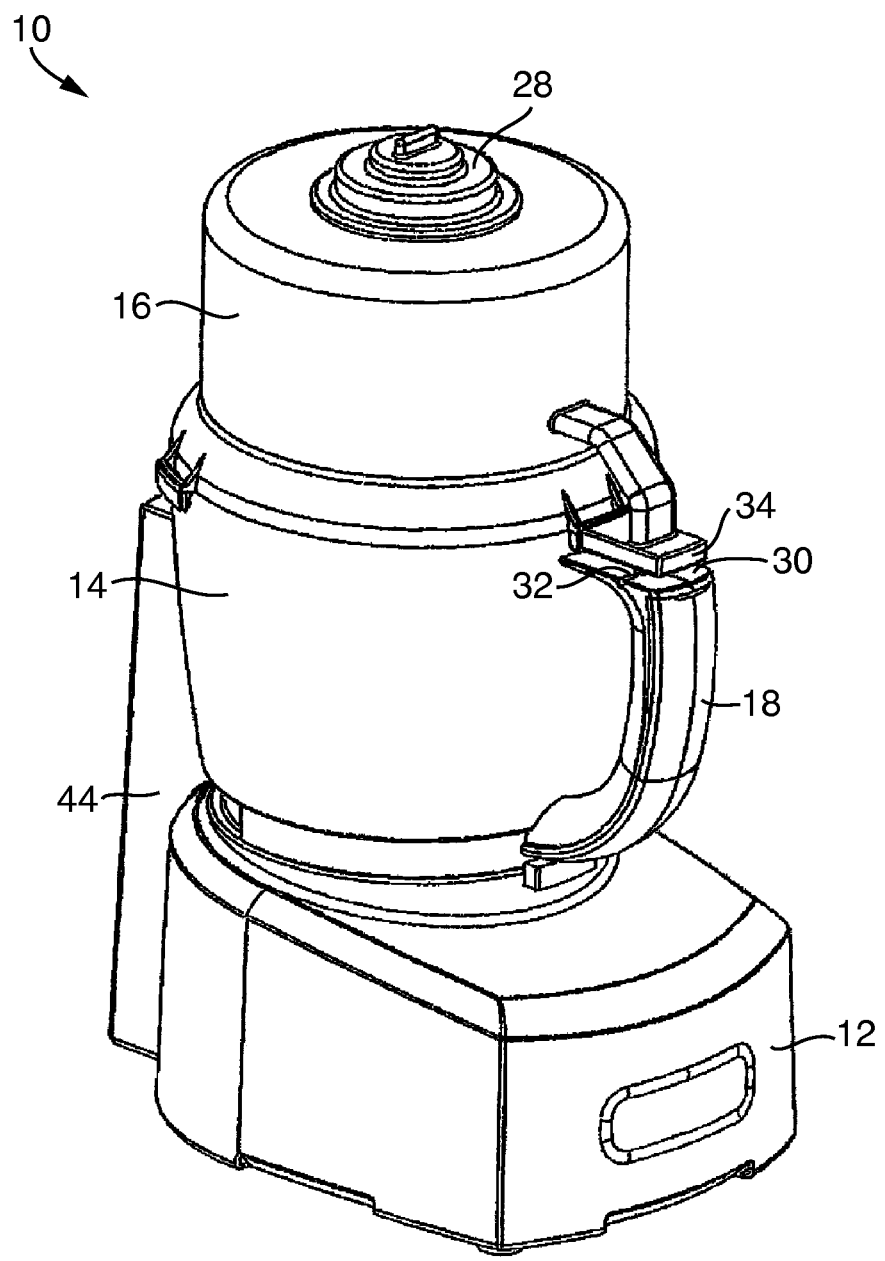
FIG. 5 is another perspective view of the cooking appliance of FIG. 1.
Figure 6:
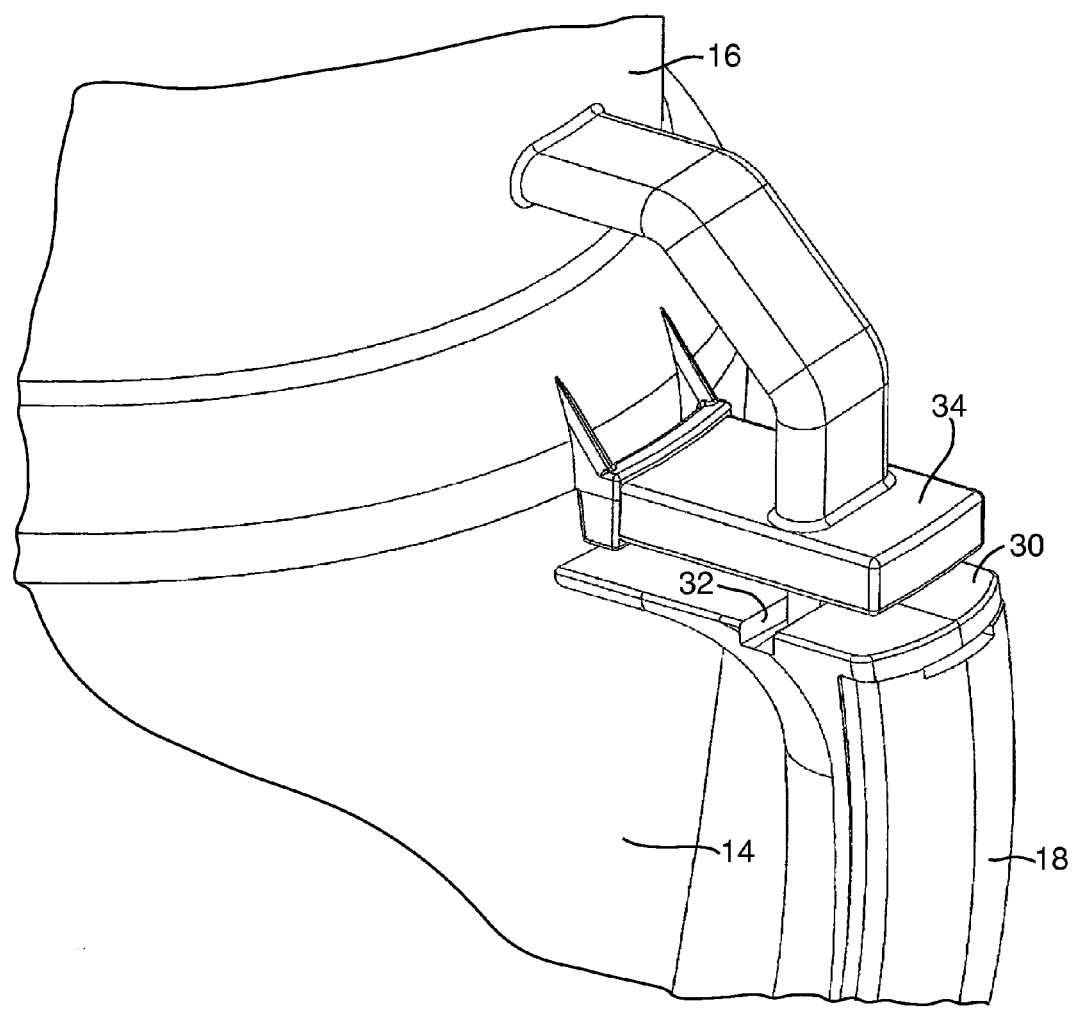
FIG. 6 is an enlarged perspective view of the cooking appliance of FIG. 1, illustrating an electrical connections pathway.

As further shown in FIGS. 4 and 5, the top portion 30 of the handle 18 is provided with a slot 32 having an electrical contact (not shown) therein. The lid 16 has a complementary extension 34 that engages the top portion 12 of the handle when the lid 16 is engaged and aligned on the bowl 14 such that an electrical contact (not shown) in the extension 34 comes into contact with the electrical contact in the slot 32 to form a continuous, electrically-conductive path. There are also electrical contacts (not shown) between the bowl 14 and the base. In this manner, electrical energy from the base 12 is transferred up through a conductor (not shown) internally running through the handle, and to the extension 34, in order to power the boiler, or heating element, housed in the lid 16. FIG. 6 is an enlarged view of the connection between the top portion 30 of the handle 18 and the extension 34. As alluded to above, electrical energy is routed from the base 12, through the handle 18 of the bowl 14, through the extension 34 of the lid 16 and to the heating element contained in the lid 16 below the boiler chamber 26.

Figure 7:
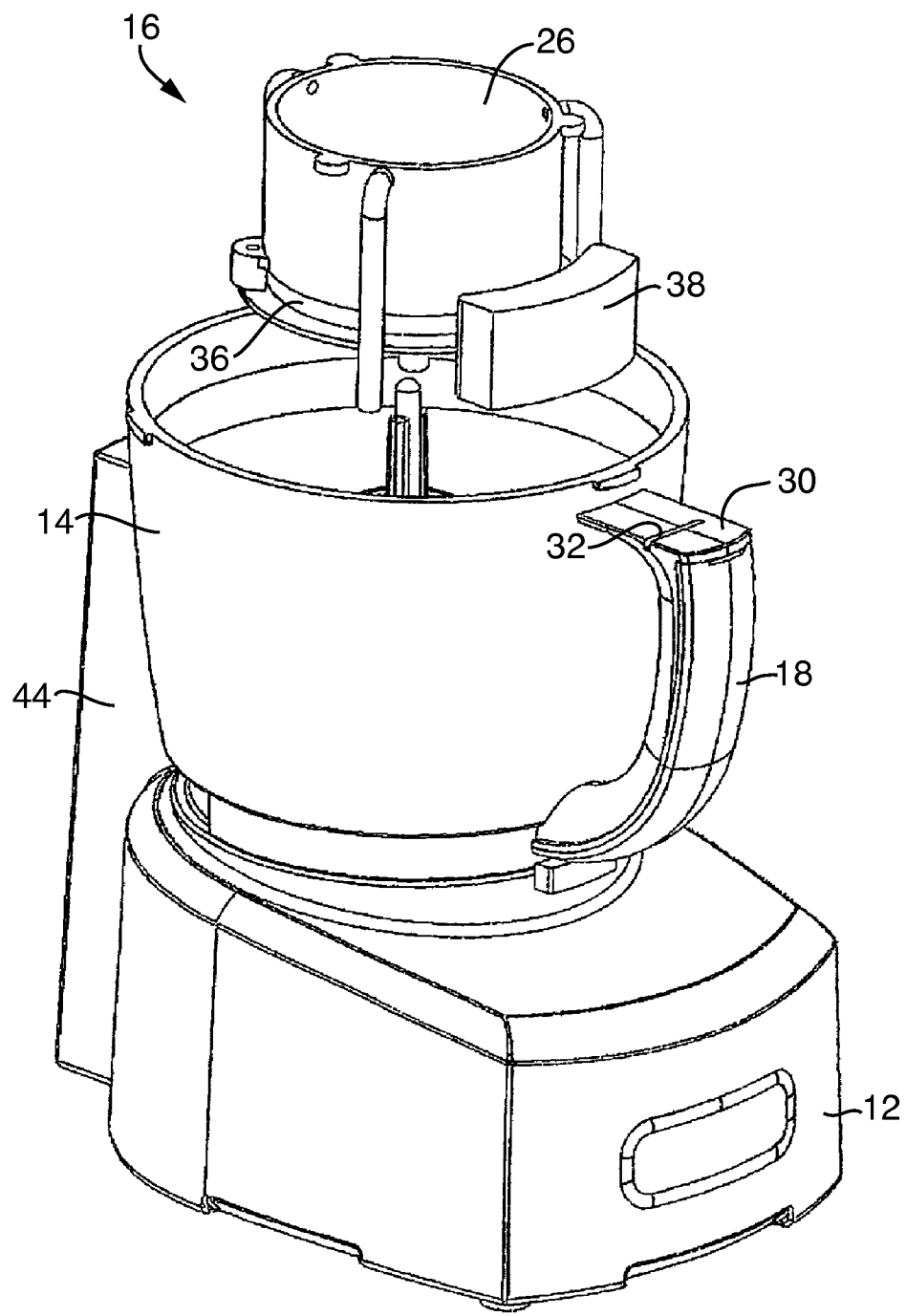
FIG. 7 is a perspective view of the cooking appliance of FIG. 1, illustrating certain internal components.

Turning now to FIG. 7, certain internal components of the lid 16 are illustrated. As shown therein, the lid 16 includes the boiler chamber 26, a heating element 36 positioned beneath the boiler chamber 26 for heating the boiler chamber 26, and electronics 38 for supplying electrical energy to the heating element 36. In an embodiment, the heating element may be an electrical resistance heating element, such as those known in the art, although other types of heating elements known in the art may also be utilized without departing from the broader aspects of the present invention.

Figure 8:
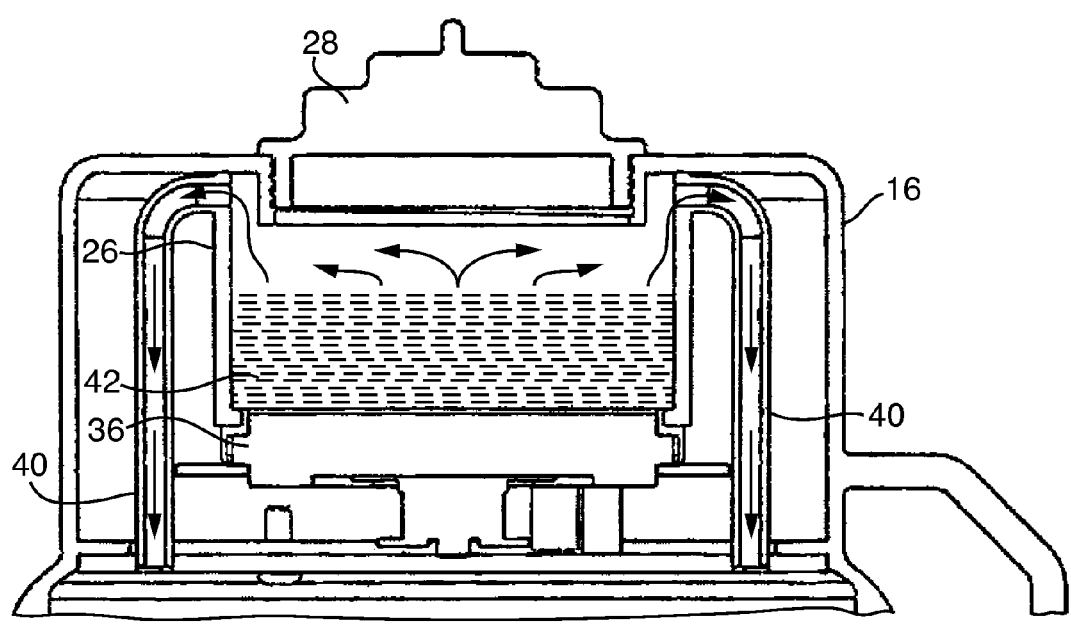
FIG. 8 is a cross-sectional view of the lid of the cooking appliance of FIG. 1, illustrating a steam flow path.
Figure 9:
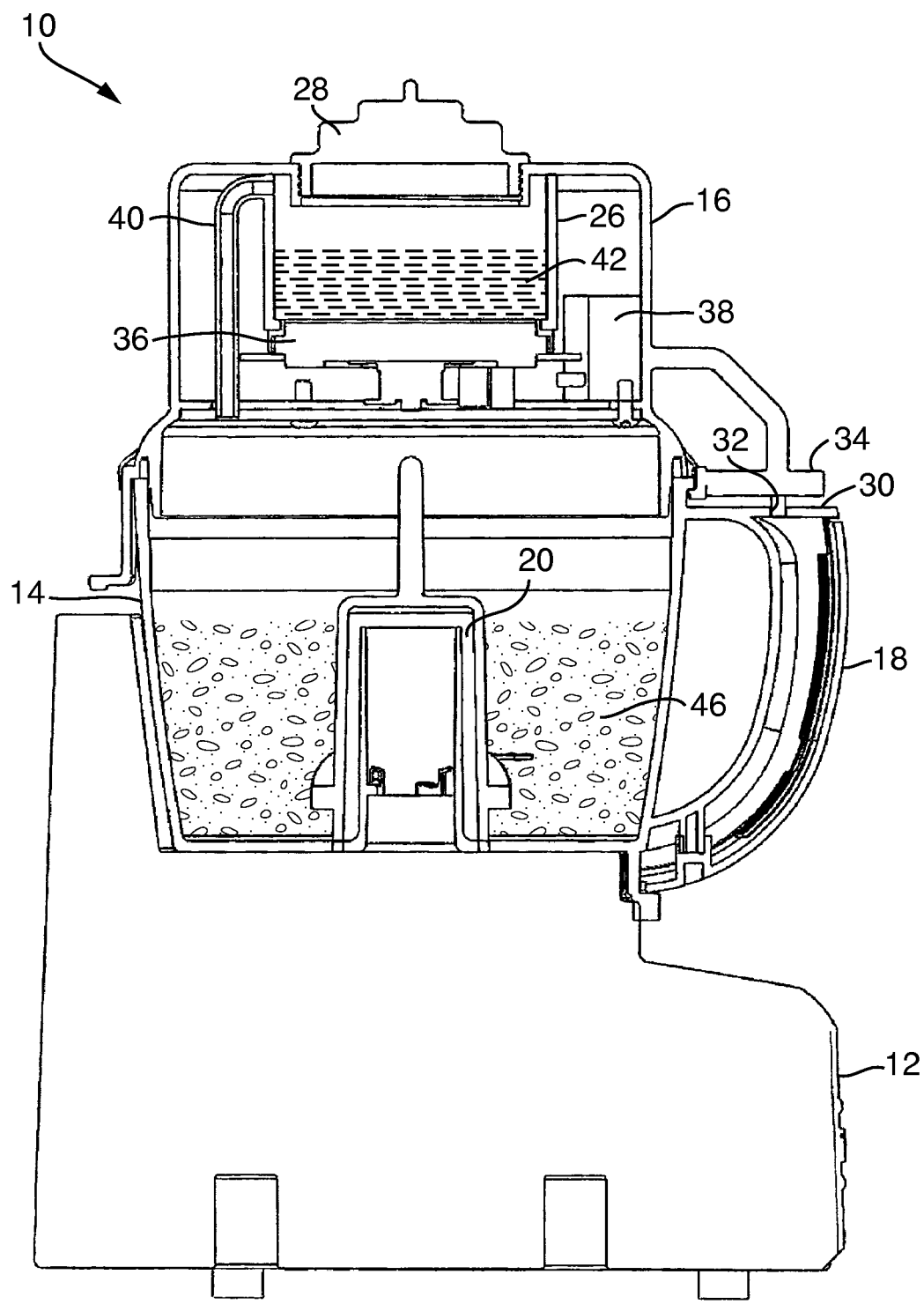
FIG. 9 is a side, cross-sectional view of the cooking appliance of FIG. 1.
Figure 10:
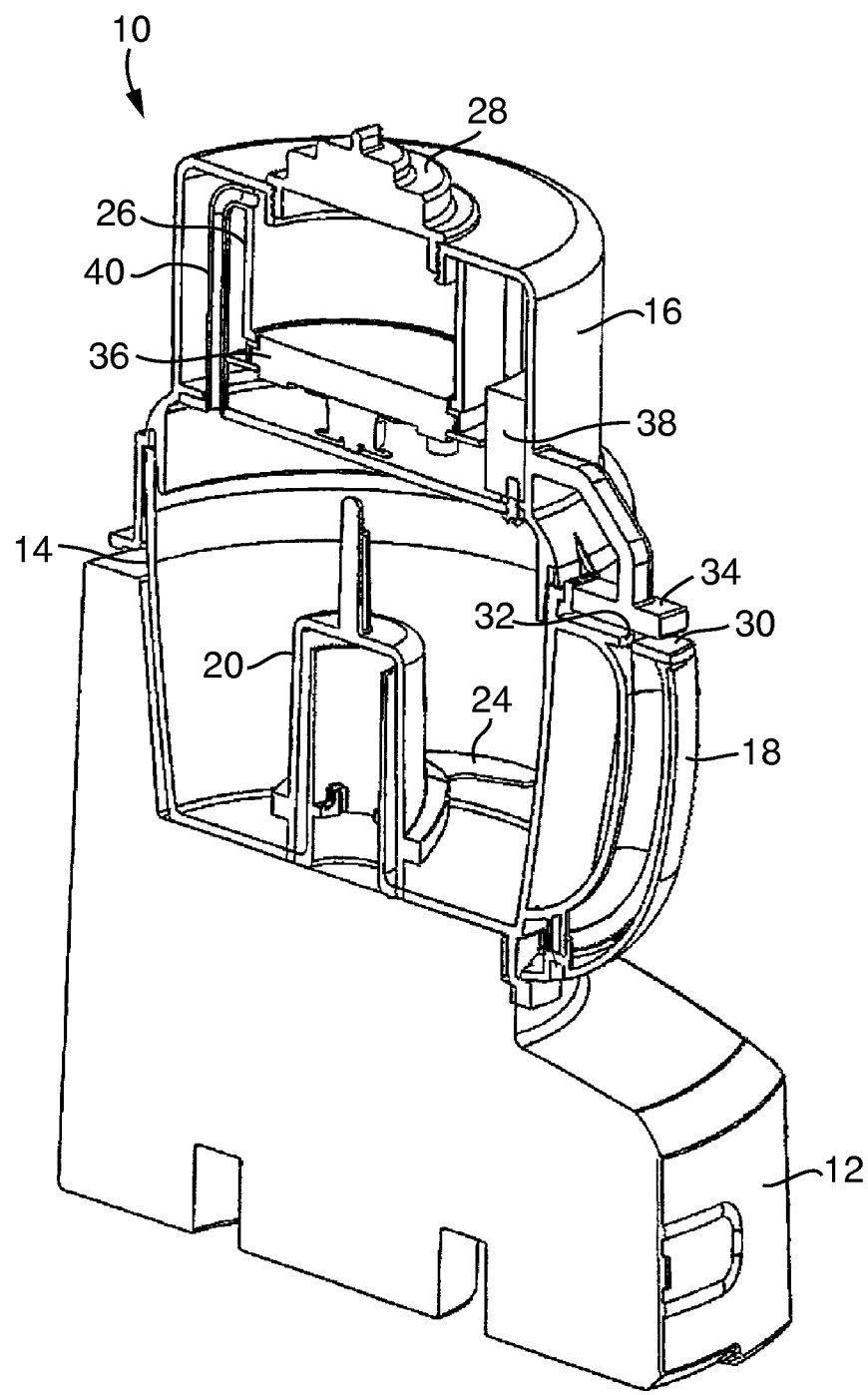
FIG. 10 is perspective, cross-sectional view of the cooking appliance of FIG. 1.

FIG. 8 is a cross-sectional view of the lid 16 illustrating a steam flow path. As shown therein, the lid 16 is formed with a plurality of steam channels 40 extending from the internal boiler chamber 26 to the bottom of the lid 16. Importantly, the steam channels 40 are in fluid communication with the interior of the bowl 14. In the preferred embodiment there are three steam channels 40 radially spaced around the periphery of the chamber 26, although more or fewer steam channels 40 may be utilized without departing from the broader aspects of the present invention. In operation, water 42 within the boiler chamber 26 is heated by the heating element 36 until steam is produced. The steam then travels from the boiler chamber 26, though the steam channels 40 and into the bowl 14 containing one or more food ingredients. Importantly, in an embodiment, the steam enters the top of the bowl 14 and cooks or heats the food ingredients from above.

Referring back to FIG. 7, in an embodiment, the cooking appliance 10 includes a safety interlock column 44 that includes mechanical and/or electro-mechanical safety interlocks (not shown) of a type generally known to those skilled in the art. The mechanical and/or electromechanical safety interlocks function to render the appliance 10 inoperable unless the bowl 14 and lid 16 are properly attached and secured.

Figure 11:
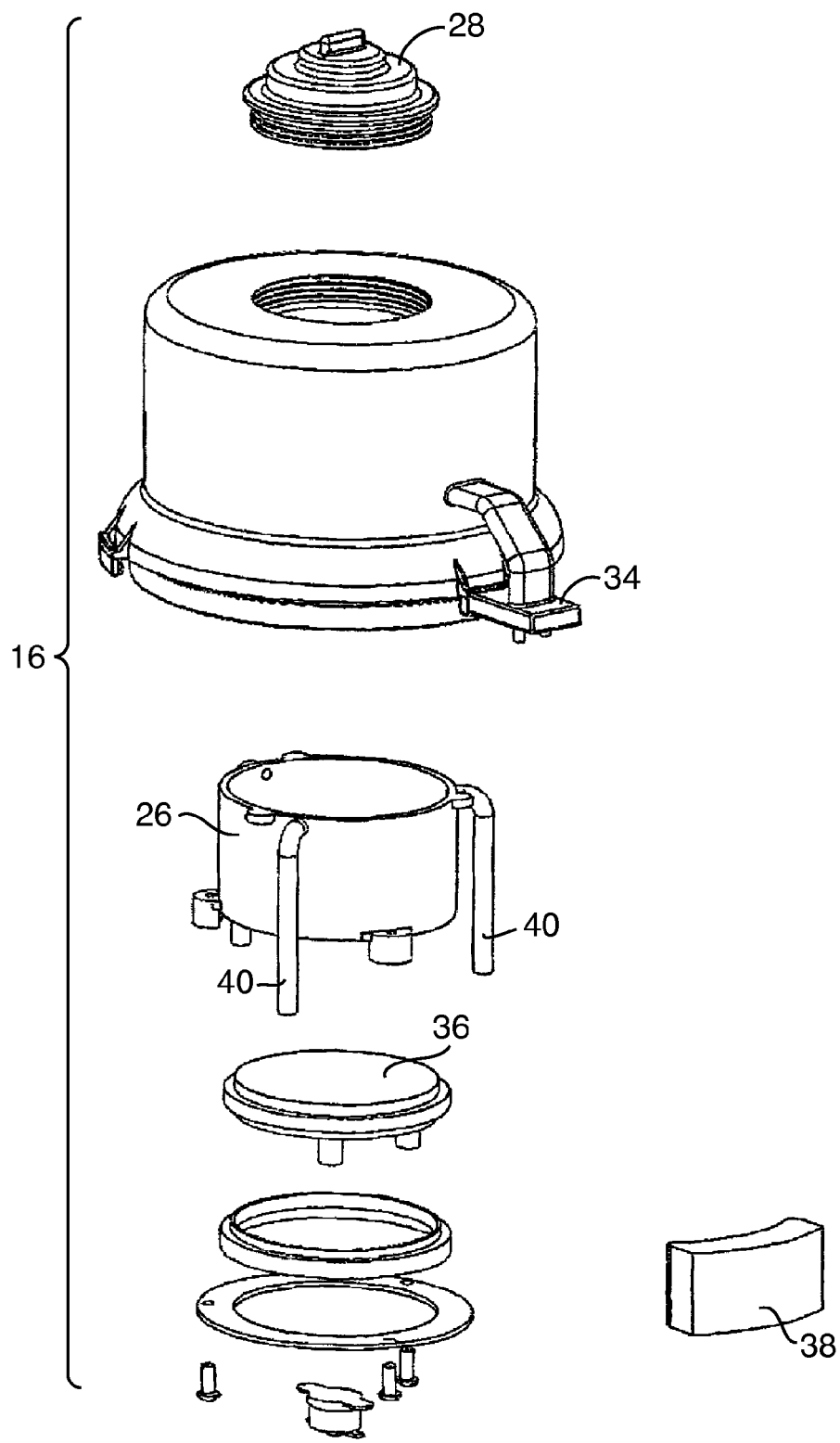
FIG. 11 is an exploded, perspective view of the lid of the cooking appliance of FIG. 1.
Figure 12:
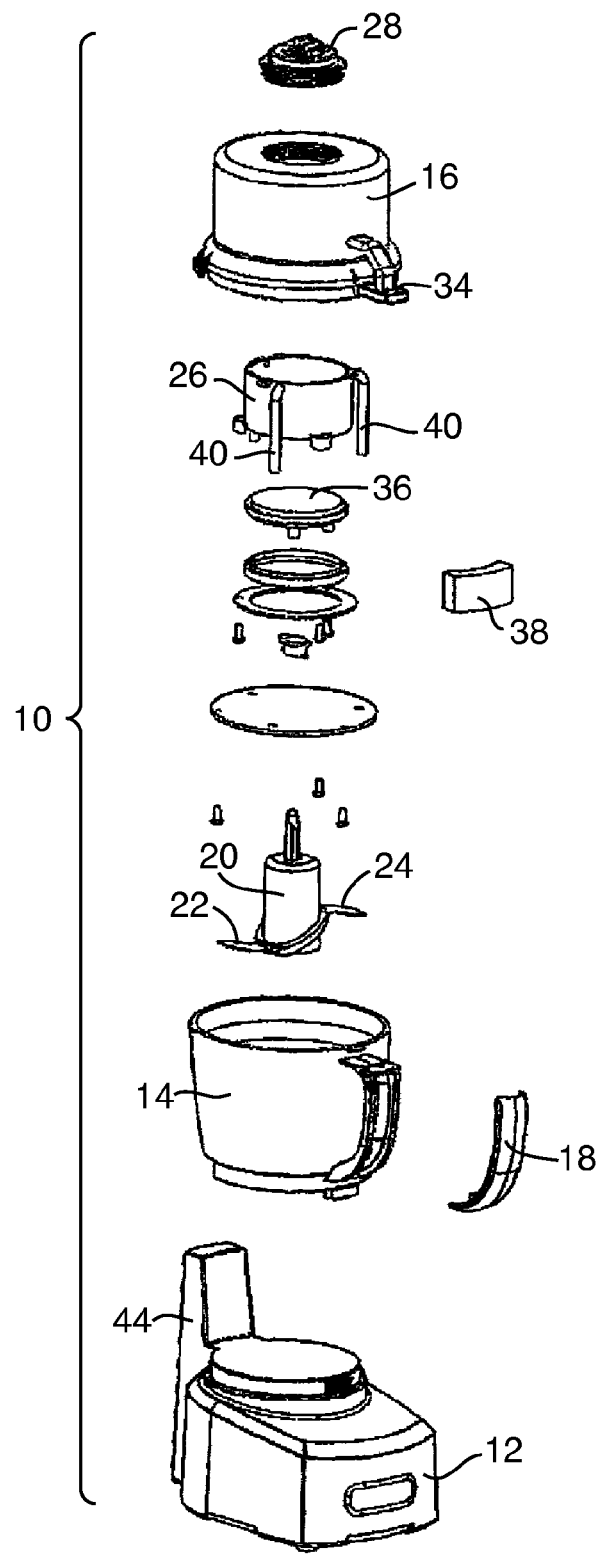
FIG. 12 is an exploded, perspective view of the cooking appliance of FIG. 1.

FIGS. 9-12 are various exploded and cross-sectional views of the cooking appliance 10 according to the first preferred embodiment of the present invention. For example, FIG. 11 is an exploded, perspective view of the lid 16 of the appliance 10. As described above, the lid 16 includes the boiler chamber 26 having a plurality of steam channels 40 extending therefrom, a heating element 36 disposed below the chamber 26, and a removable cap 28. The components housed within the lid 16 may be assembled using mounting brackets, gaskets and a plurality of screws.

In operation, the lid 16 may be removed from the bowl 14 and one or more food ingredients 46 may be placed in the bowl 14. The lid may then be attached to the bowl 14 and the boiler chamber 26 may be filled with water or other liquid. Cap 28 may then be screwed onto the lid 16 to fully enclose the boiler chamber 26. A user may then control operation of the device from the base 12. In an embodiment, the appliance 10 may chop or puree the food ingredients 46 within the bowl 14 utilizing the blade assembly 20. The heating element 36 may then be activated to produce steam to cook or heat the pureed food ingredients. In other embodiments, the food ingredients 46 may be heated or cooked first via steam from the boiler chamber 26, then chopped or pureed by the blade assembly 20. In yet other embodiments, the chopping/pureeing and cooking/heating functions may be carried out simultaneously.

As noted above, the cooking appliance 10 of the present invention permits steaming/cooking and processing of food ingredients within a single bowl, thereby obviating the need to transfer the food ingredients to additional/separate containers to carry out separate steaming and processing functions.

Referring to FIGS. 13-18, a cooking appliance 100 according to a second embodiment of the present invention is disclosed. The cooking appliance 100 is generally similar in configuration and function to the cooking appliance 10 described above and includes a base 110, a bowl 112, and a lid 114. The bowl 112 is preferably made of glass or plastic and is transparent to enable a user to view the condition of the food ingredients contained therein during use. The base 110 houses an electric motor (not shown) and associated electrical and mechanical components (not shown) associated with the motor, its drive output, the heat element, and controls, all of types generally known to those of ordinary skill in the art. An electrical cord (not shown) extends from the base 110 and plugs into and outlet of an external electrical power source. Control buttons or dials (not shown), of a type generally known to those of ordinary skill in the art, may be provided on the base 110 for enabling a user to control and operate the appliance 100. A handle 116 is provided on the outside of the bowl 112 to facilitate removal and attachment of the bowl 112 to the base 110.

Figures 13, 14:
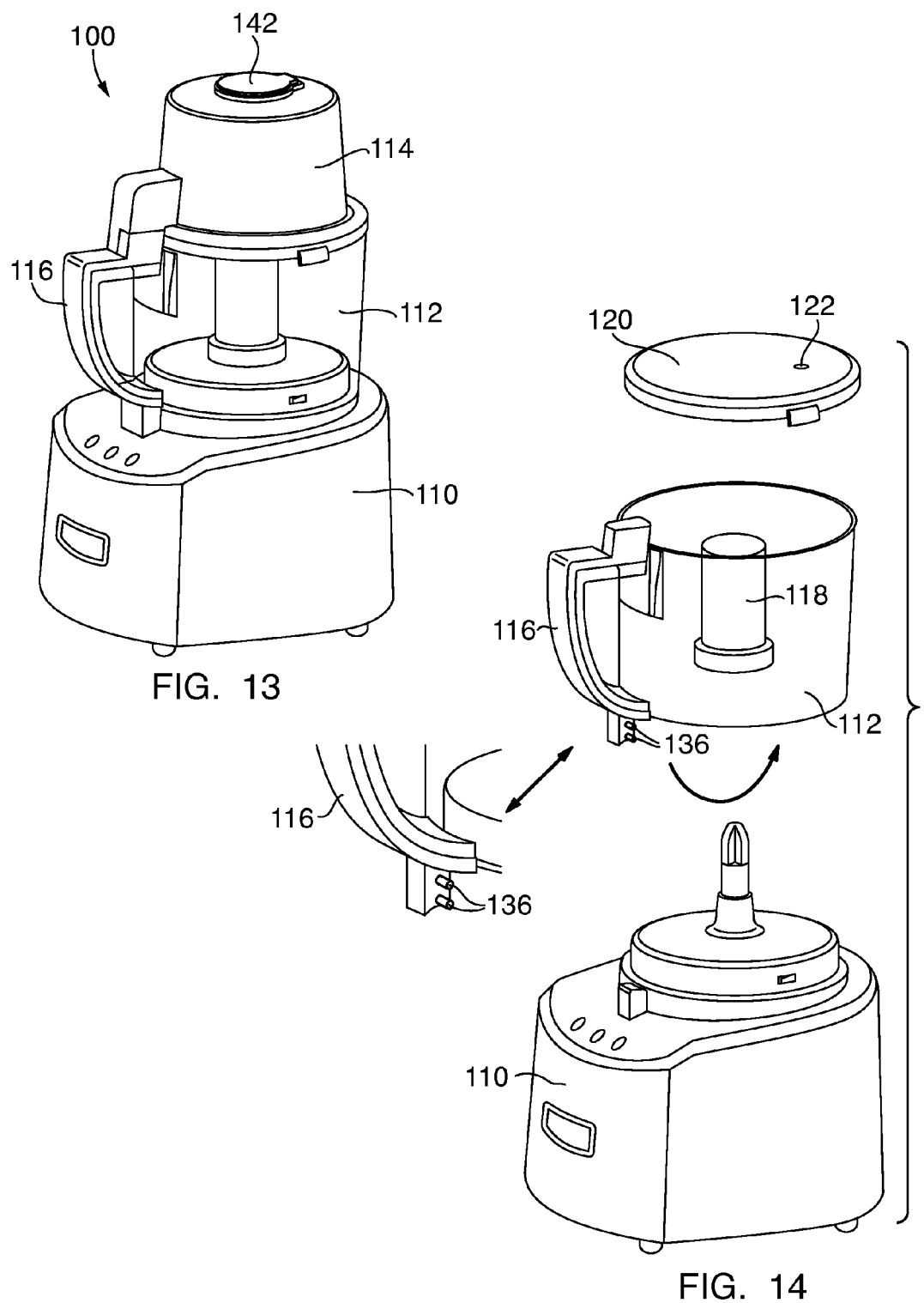
FIG. 13 is a perspective view of a cooking appliance in accordance with another embodiment of the present invention.
FIG. 14 is an exploded, right-hand side, perspective view of the cooking appliance of FIG. 13 illustrating the connection between the bowl and the base.
Figure 15:
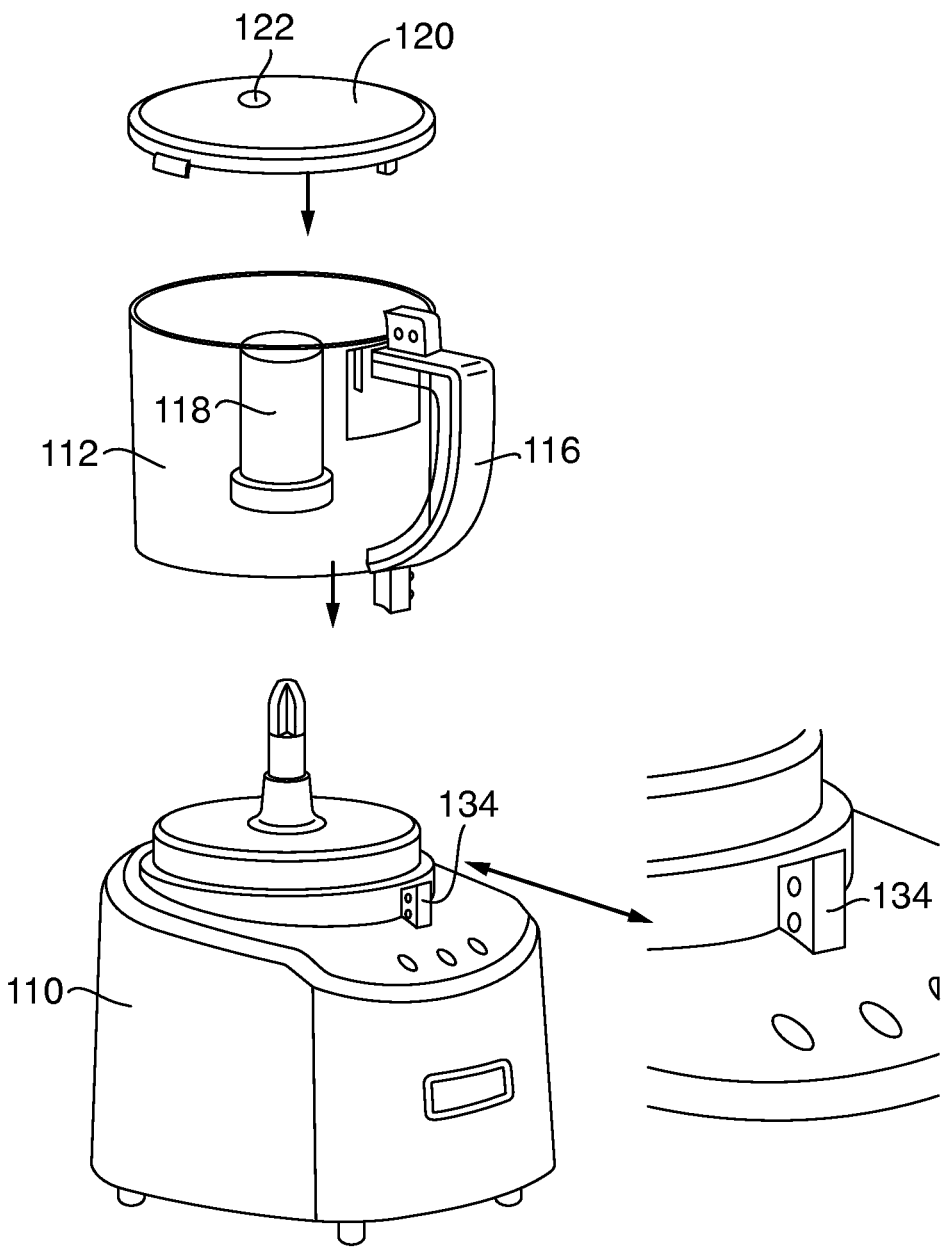
FIG. 15 is an exploded, left-hand side, perspective view of the cooking appliance of FIG. 13, illustrating the connection between the bowl and the base.

As shown in FIGS. 14 and 15, a blade assembly 118 having a plurality of blades is rotatably mounted within the bowl in a similar manner to that described above. In particular, the blade assembly is rotatably mounted to a driven output shaft extending from the base 100 and through an opening (not shown) in the floor of the bowl 112. A bowl cover 120 is releasably attached to the top rim of the bowl 112. As further shown in FIGS. 14 and 15, the bowl cover 120 includes a plurality of small apertures 122 through which steam may pass, as discussed hereinafter.

Referring now to FIG. 16, the a top portion 124 of the handle 116 is provided with a socket 126 having holes 128 housing electrical contacts (not shown). The lid 114 has an extension 130 with pins 132 that are received in holes 128 when the lid 114 is operatively engaged and aligned on the bowl 112 in a proper manner for operation, forming an electrically-conductive path between the bowl 112 and the lid 114. Similarly, electrical conductors 134 on the base 110 transmit electricity from the base 110 to the internal electrical conductors (not shown) in the handle 116 via contacts 136. In this manner, electrical energy from the base 110 is transferred up through a conductor (not shown) internally running through the handle 116, and to the extension 130, in order to power the boiler, or heater, housed in the lid 114.

With reference to FIG. 17, the lid 114 includes a boiler chamber 138 and a boiler/heating element 140. The lid 114 also includes a cap 142 that may be removed by a user so that a user can add water to the boiler chamber 138.

Figure 18:
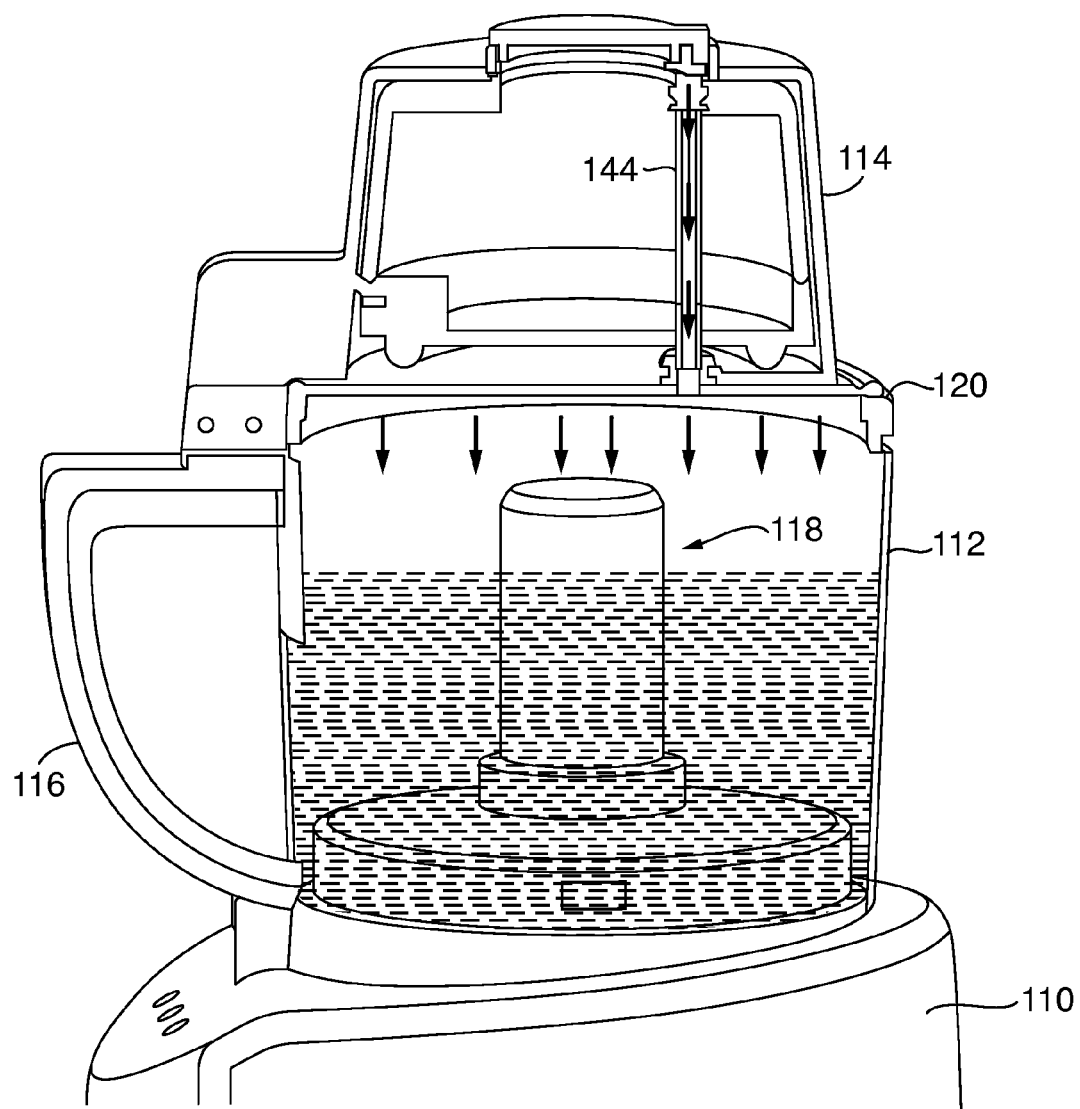
FIG. 18 is an enlarged, perspective view of the cooking appliance of FIG. 13, illustrating a steam flow path.

In operation, water in the chamber 138 is heated and turned to steam, and the steam is caused to travel through a tube 144 formed in the lid 114 in the direction of the arrows and be dispersed through apertures 122 in bowl cover 120, as shown in FIG. 18. As will be readily appreciated, the cooking appliance 100 according to the second preferred embodiment functions in much the same manner to cook/heat and process food as cooking appliance 10.

Figure 19:
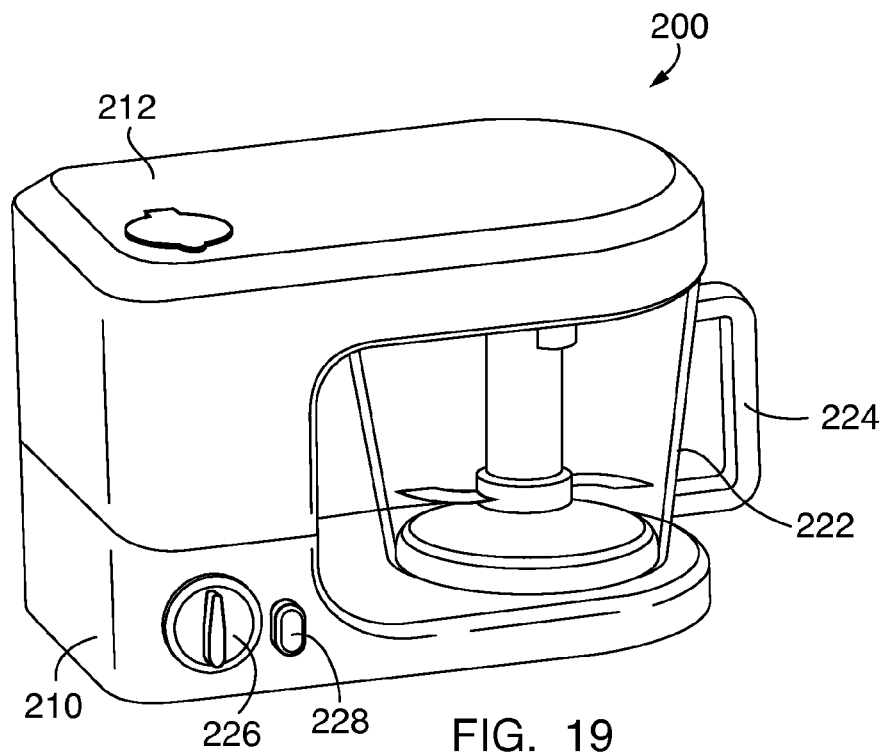
FIG. 19 is a perspective view of a cooking appliance in accordance with another embodiment of the present invention.
Figure 20:
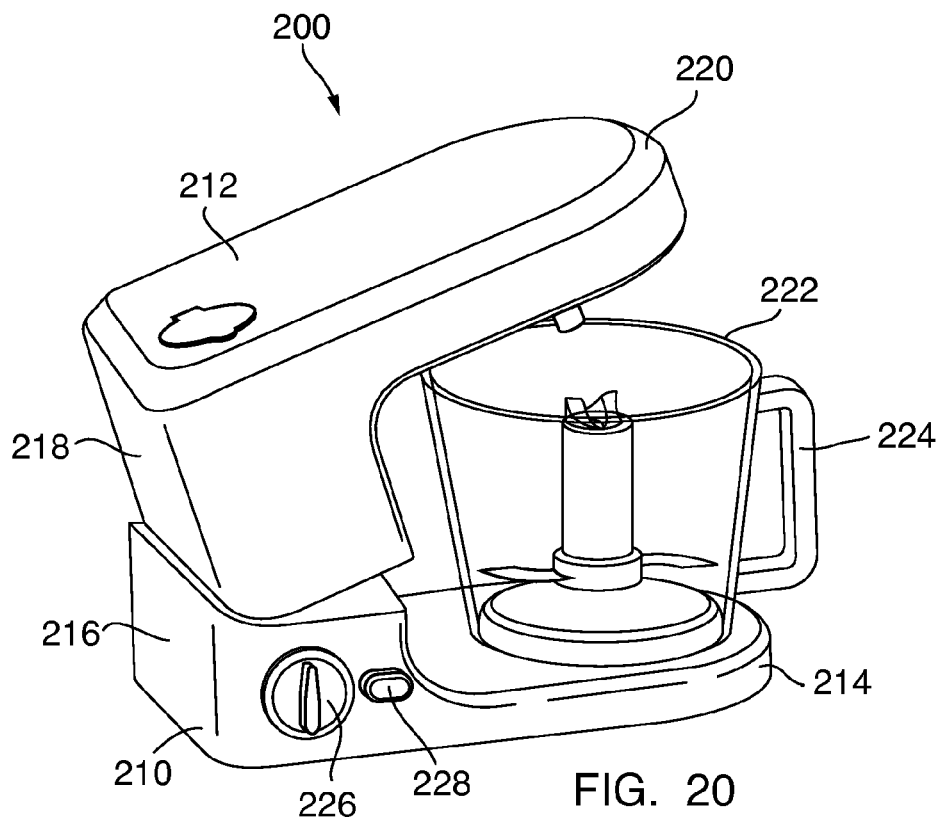
FIG. 20 is a perspective view of the cooking appliance of FIG. 19, illustrating a loading position.

Referring to FIGS. 19-29, a cooking appliance 200 according to a third embodiment of the present invention is disclosed. The cooking appliance 200 includes a two-piece housing having a base 210 and a hingedly attached to upper housing 212. As best shown in FIGS. 19 and 20, the base 210 has a flat section 214 and a column section 216. The upper housing 212 has a column section 218 and a cantilever section 220. The cantilever section 220 extends away from the column section 218 and is generally located above the flat section 214 of the base 210. A bowl 222 is sized and shaped to be received on the base 210 and beneath the cantilever section 220. The bowl 222 is provided with a handle 224.

As shown in FIG. 20, the upper housing 212 may be pivoted relative to the base 210 so that it tilts away from the base 210, causing the cantilever section 220 to lift away from the bowl 222 to facilitate insertion or removal of the bowl 222. A control dial 226 for operating and controlling the appliance 200 may be provided on the base 210. The base 210 and upper housing 212 are locked relative to each other in a non-tilted position. A release button 228 on the base 210 unlocks the base 210 and upper housing 212 from a state in which they are relatively locked in order to facilitate the tilting illustrated in FIG. 20.

Figure 21:
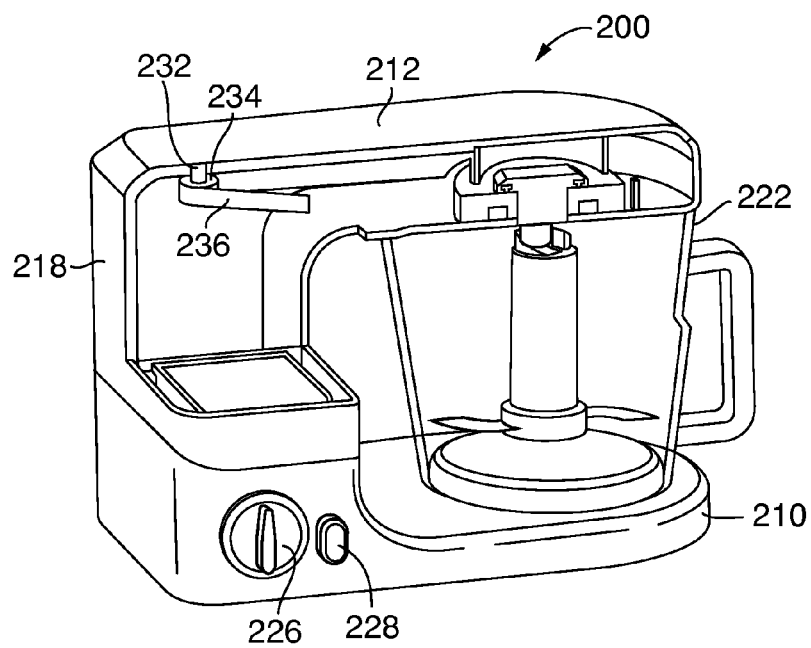
FIG. 21 is partial cross-sectional, perspective view of the cooking appliance of FIG. 19.
Figure 23:
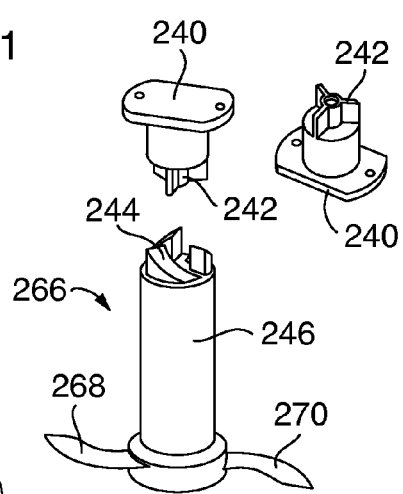
FIG. 23 is a perspective view of a blade assembly and torque transmitting assembly of the cooking appliance of FIG. 19.
Figure 22:
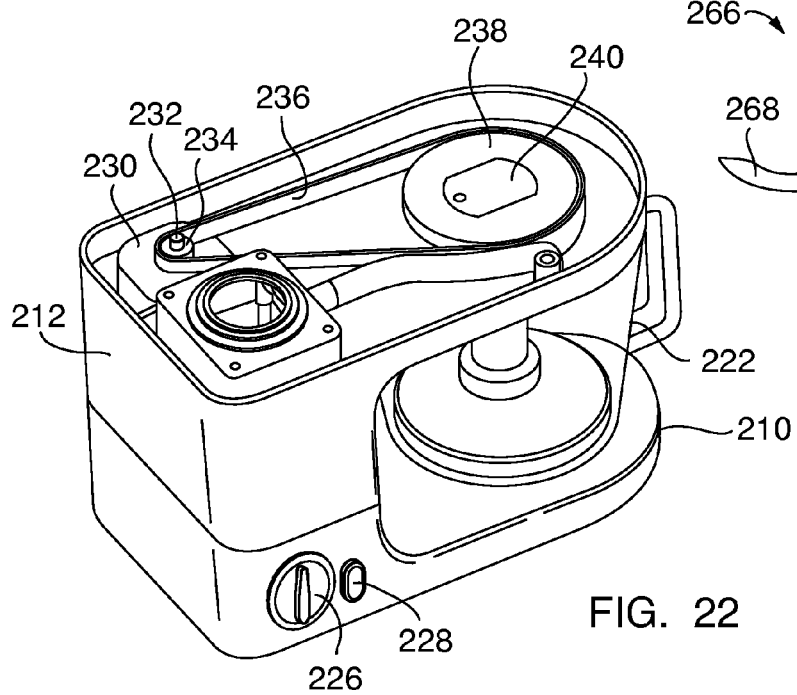
FIG. 22 is a perspective view of the cooking appliance of FIG. 19, illustrating certain internal components thereof.

Referring to FIGS. 21 and 22, the upper housing 212 includes an electric motor 230 that rotatably drives a shaft 232 and pulley 234, causing a belt 236 to be driven. The driven belt 236 rotates a second pulley 238 to which a torque transmitting member 240 is attached. The torque transmitting member 240 has a torque drive end 242 that engages a torque driven end 244 on the axis 246 of a blade assembly 266 having first and second blade edges 268, 270. This mechanism drives the blade assembly 266 to mix, chop or blend food ingredients in the bowl 222

As shown in FIGS. 24 and 25, a cone-shaped pivot 272 is provided on the floor of the bowl 222 to rotationally support the blade assembly 266 by engaging a matching cone-shaped indent 274 in the bottom of the blade assembly 266. A recess 276 on the bottom of the bowl 222 receives protruding base portion 278 on the base flat section 214 to locate the bowl 222 in operation position.

Figure 28:
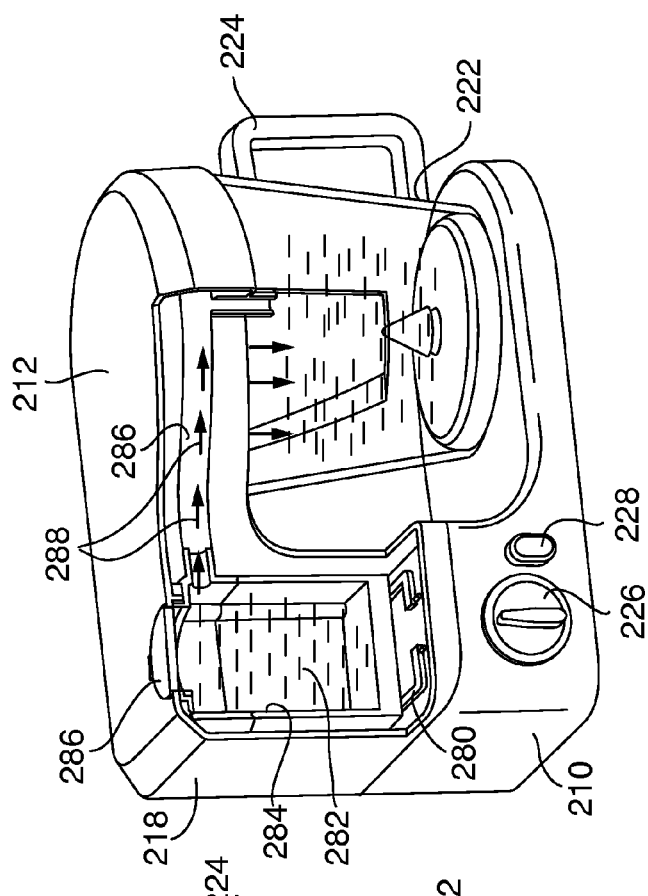
FIG. 28 is a partial cross-sectional, perspective view of the cooking appliance of FIG. 19.
Figure 29:
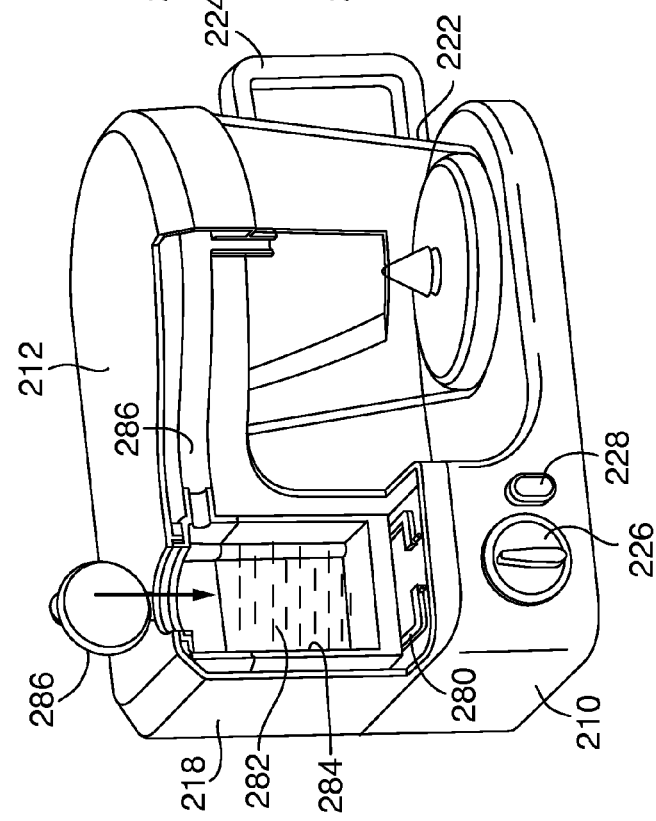
FIG. 29 is a partial cross-sectional, perspective view of the cooking appliance of FIG. 19, illustrating a steam flow path.

Referring now to FIGS. 28 and 29, a heating element 280 in the column section 218 of the upper housing 212 functions to heat water 282 in a boiler chamber 284 located above it. The boiler chamber 284 may be filled with water by removing a cap 286.

In operation, steam 288 is produced when the water 282 within the boiler chamber 284 is heated by the heating element 280. As shown in FIG. 29, the steam travels from the boiler chamber 284, through silicone tube 286, and into the bowl 222, where it functions to heat or cook one or more food ingredients within the bowl 222. As will be readily appreciated, the cooking appliance 200 according to the third preferred embodiment functions in much the same manner to cook/heat and process food as cooking appliances 10 and 100, described above.

Although this invention has been shown and described with respect to the detailed embodiments thereof, it will be understood by those of skill in the art that various changes may be made and equivalents may be substituted for elements thereof without departing from the scope of the invention. In addition, modifications may be made to adapt a particular situation or material to the teachings of the invention without departing from the essential scope thereof. Therefore, it is intended that the invention not be limited to the particular embodiments disclosed in the above detailed description, but that the invention will include all embodiments falling within the scope of this disclosure.

What is claimed is:

1. A cooking appliance, comprising:
   a base;
   a container engageable with said base and configured to receive one or more food ingredients;
   a blade assembly rotatably mounted in said container; and
   a lid engageable with said container, said lid including a floor and peripheral sidewalls defining a chamber configured to hold a volume of liquid in spaced relation to said container, a heating element positioned below said chamber for heating said liquid within said chamber to produce steam, and at least one channel formed in said lid, said at least one channel extending from an upper portion of said chamber to said container and providing a flow passageway between said chamber to said container for directing said steam from said chamber to said container;

wherein said lid including said chamber and said heating element is positioned directly above said container.

2. The cooking appliance of claim 1, wherein:
said at least one channel is configured to direct said steam from said chamber to a top of said container.

3. The cooking appliance of claim 2, further comprising:
a cover releasably engageable with said container, said cover having a plurality of apertures formed therein to control the ingress of said steam into said container.

4. The cooking appliance of claim 1, wherein:
said lid includes a removable cap.

5. The cooking appliance of claim 1, wherein:
said container includes a handle; and
wherein said heating element is in electrical communication with said base via an electrical pathway through said handle.

6. The cooking appliance of claim 5, wherein:
said handle includes at least one first electrical contact engageable with at least one second electrical contact in said base.

7. A cooking appliance, comprising:
a base;
a container engageable with said base and configured to receive one or more food ingredients;
a blade assembly rotatably mounted in said container;
a chamber positioned atop said container and releasably engageable with said container, said chamber being configured to hold a volume of liquid in spaced relation to said container;
a heater below said chamber and in close association with said chamber for converting said liquid within said container into a cooking vapor; and
a vapor flow channel extending between said chamber and said container and having an inlet spaced above a floor of said chamber and in fluid communication with said chamber and an outlet adjacent to a top of said container.

8. The cooking appliance of claim 7, further comprising:
a cover releasably engageable with said container and positioned intermediate said container and said chamber, said cover having a plurality of apertures formed therein to control an ingress of said cooking vapor through said top of said container.

9. The cooking appliance of claim 7, further comprising:
an upper housing hingedly connected to said base.

10. The cooking appliance of claim 7, further comprising:
a cap associated with said chamber, said cap being movable between a closed position in which access to said chamber is prevented, and an open position in which access to said chamber is permitted.

11. The cooking appliance of claim 7, wherein:
said heating element is in electrical communication with said base through an electrical pathway through a handle of said container.

12. The cooking appliance of claim 11, wherein:
said handle includes a first electrical contact engageable with a second electrical contact in said base.

* * * * *